J. FAY.
ANIMAL POKE.
APPLICATION FILED FEB. 28, 1917.
1,272,932.
Patented July 16, 1918.
Fig. 1,
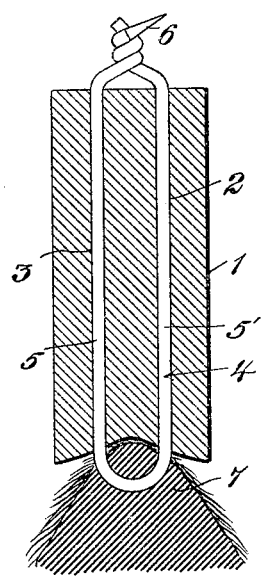
Fig. 2,
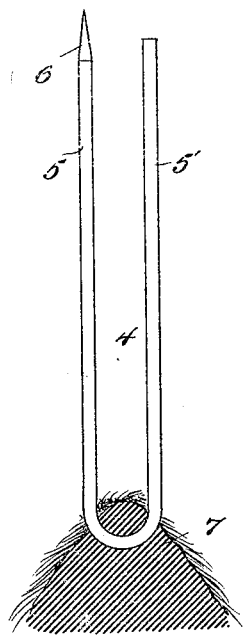
Fig. 3,
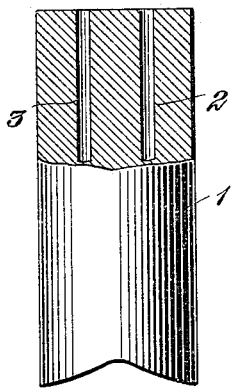
Fig. 4.
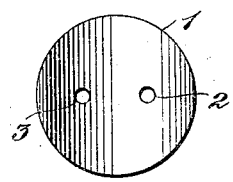
WITNESSES
Edw. Thorpe
C Bradway
INVENTOR
J. Fay.
BY
ATTORNEYS

UNITED STATES PATENT OFFICE.

JOHN FAY, OF COLUMBUS, NORTH DAKOTA.

ANIMAL-POKE.

1,272,932.  Specification of Letters Patent.  Patented July 16, 1918.

Application filed February 28, 1917. Serial No. 151,416.

*To all whom it may concern:*

Be it known that I, JOHN FAY, a citizen of the United States, and a resident of Columbus, in the county of Burke and State of North Dakota, have invented a new and Improved Animal-Poke, of which the following is a full, clear, and exact description.

This invention relates to an animal poke, and more particularly to a poke which combines with it means whereby the animal can be stamped or branded with the owner's name, to thereby save the burning of the hide of the animal and consequent depreciation of the price of the hide when it is sold.

The invention has for its general objects to provide a combined animal poke and branding device which is of comparatively simple and inexpensive construction, capable of being easily and quickly applied to the animal, and so designed as to effectively prevent the animal from escaping through fences or other barriers.

A more specific object of the invention is the provision of a device of the character referred to which embodies a doubled wire sharpened at one end so as to be pierced through the neck of the animal, and on the wire is fastened a body which is large enough to bear the stamp or brand of the owner, and also which contributes to render the poke effective in preventing the animal from escaping through fences or the like.

With such objects in view, and others which will appear as the description proceeds, the invention comprises various novel features of construction and arrangement of parts which will be set forth with particularity in the following description and claim appended hereto.

In the accompanying drawing, which illustrates one embodiment of the invention and wherein similar characters of reference indicate corresponding parts in all the views, Figure 1 is a vertical section of the device shown applied to the neck of an animal of the swine, bovine or equine species;

Fig. 2 is a similar view before the body of the device is applied to the wire;

Fig. 3 is a side view, partly in section, of the body; and

Fig. 4 is a bottom plan view of the body.

Referring to the drawing, 1 designates the body of the device, which is preferably, although not necessarily, a cylindrical piece of wood which has two longitudinal passages 2 and 3 extending from one end to the other and parallel with each other and to one side of the center. The lower end of the body 1 is recessed or reëntrant to better fit the neck of the animal. The body A is fastened to the animal by means of a U-shaped wire 4, the member 5 of which has a sharpened extremity 6 so as to enable the wire to be more easily pierced through the neck 7 of the animal. After the wire is applied to the neck of the animal, as shown in Fig. 1, the two members 5 and 5' of the wire are passed through the passages 2 and 3 and the upper protruding ends of the wire are twisted together, as shown in Fig. 1. On the external surface of the body may be stamped or branded the owner's name. Thus, the device has two functions serving to prevent the animal from escaping through fences or under other barriers, and serving to brand the animal.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

A device of the class described comprising a cylindrical block having one end shaped to fit the neck of an animal and having two longitudinal passages extending entirely through the block from one end to the other and a fastening wire doubled on itself to form a loop, having its members extending through the passages and projecting out of the same whereby the ends can be tied together.

JOHN FAY.

Copies of this patent may be obtained for five cents each, by addressing the "Commissioner of Patents, Washington, D. C."